2,334,629

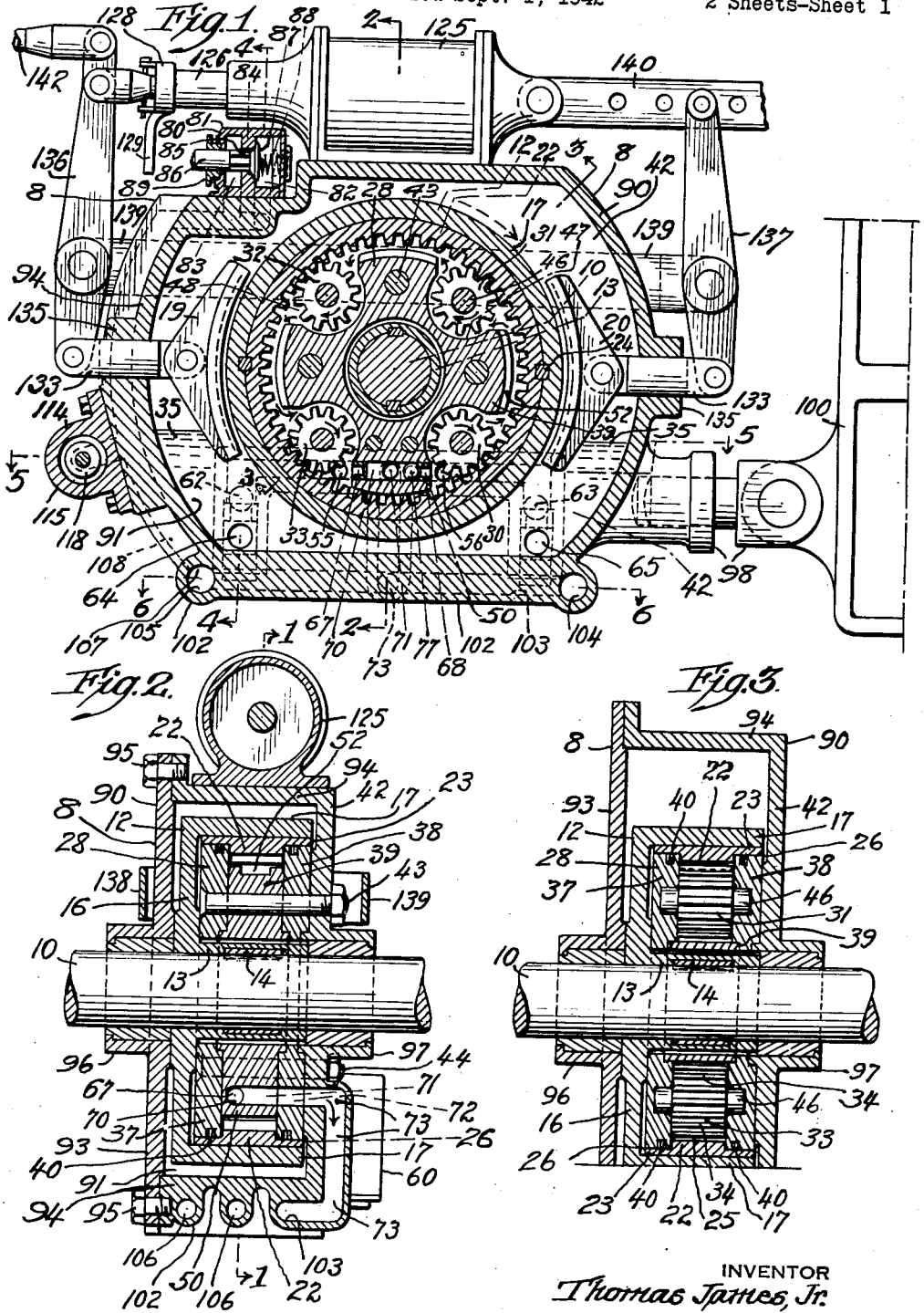
Nov. 16, 1943.  T. JAMES, JR  2,334,629
HYDRODYNAMIC BRAKE
Filed Sept. 1, 1942  2 Sheets-Sheet 1
INVENTOR
*Thomas James, Jr.*
BY
*F. DeWitt Goodwin*
ATTORNEY Nov. 16, 1943.    T. JAMES, JR    2,334,629
HYDRODYNAMIC BRAKE
Filed Sept. 1, 1942    2 Sheets-Sheet 2
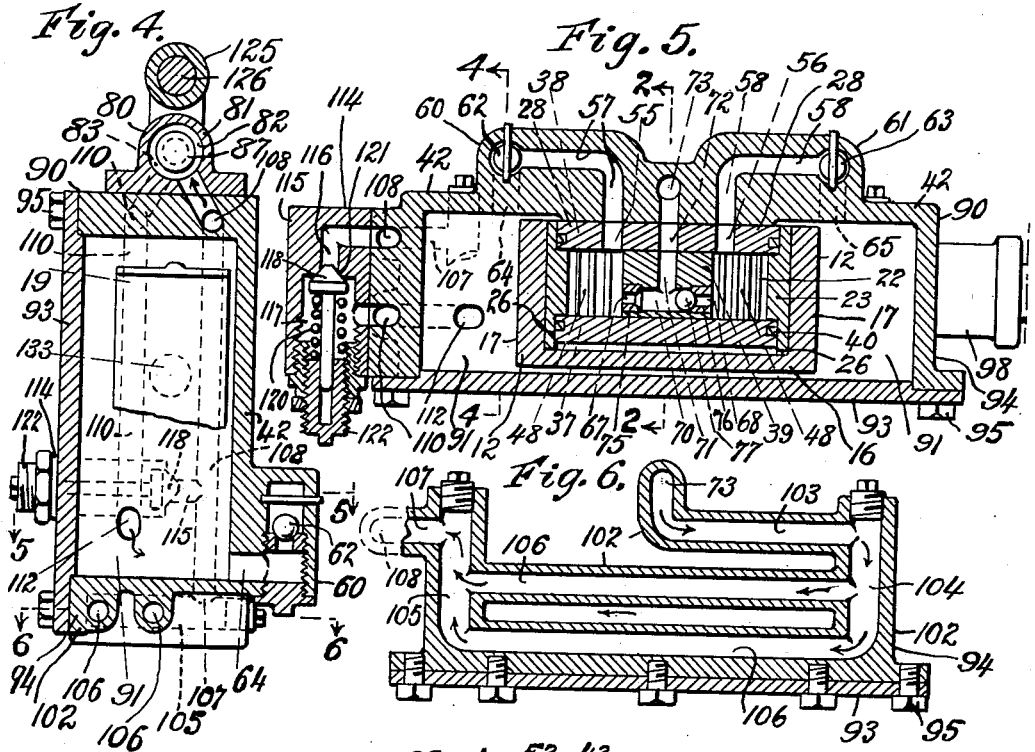
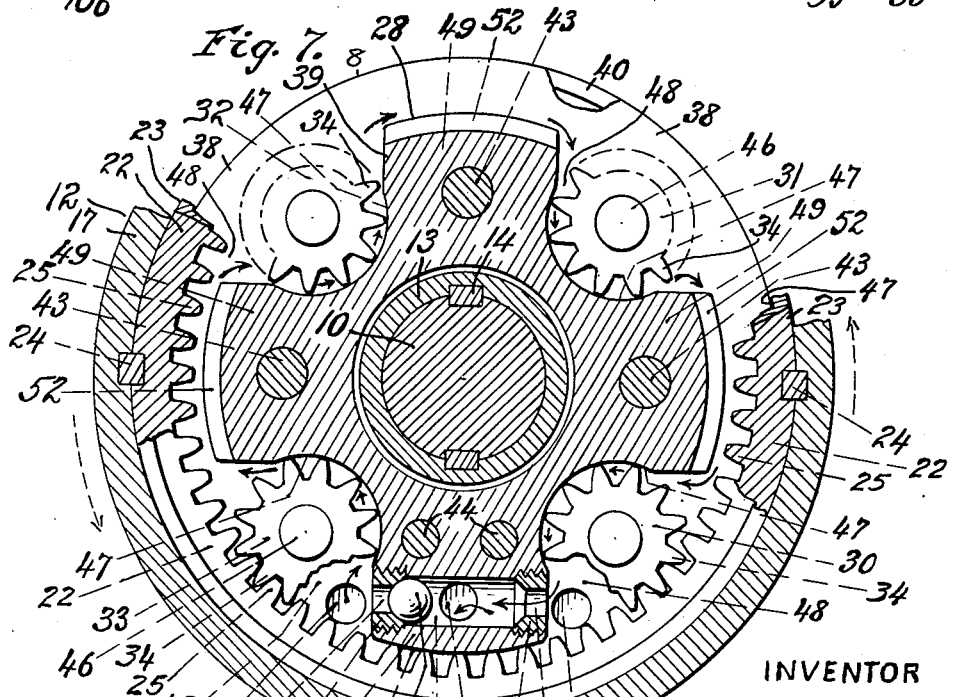
INVENTOR
Thomas James, Jr.
By F. DeWitt Goodwin
ATTORNEY Patented Nov. 16, 1943

UNITED STATES PATENT OFFICE 2,334,629

HYDRODYNAMIC BRAKE

Thomas James, Jr., Oaklyn, N. J.

Application September 1, 1942, Serial No. 456,849

18 Claims. (Cl. 188—86)

My invention relates to improvements in hydrodynamic brakes for shafts and is particularly adapted for use upon axles of railway cars, automobiles, military tanks and the like.

The object of my invention is to provide a brake with means for circulating a fluid through a system of passages and a control valve adapted for resisting the free flowing of the fluid for applying a braking action to a rotatable shaft, such as the axle of a vehicle.

A further object is to employ fluid circulating gears, actuated by a rotatable shaft, and adapted for circulating the fluid through a control valve for checking the flow of the fluid, whereby the fluid will resist the rotation of the gears, which in turn will act as a brake for holding the shaft, or axle, against rotation.

A further object is to provide a brake arranged for circulating the fluid in one direction through the control valve, regardless of the direction of rotation of the shaft upon which the brake is mounted.

A further object is to provide a novel form of gear mechanism adapted for carrying out my invention.

A further object is to provide a rotatable casing enclosing the gears and enclose said casing in a stationary housing forming a fluid reservoir and adapted for catching the leakage of fluid from the rotatable unit.

A further object is to construct the rotatable casing in the form of a brake drum and provide brake shoes for frictionally applying braking power to the shaft for holding the same against rotation when the vehicle is stopped upon an inclined surface.

These together with various other novel features of construction and arrangement of the parts, which will hereinafter be more fully described and claimed, constitute my invention.

Referring to the accompanying drawings:

Fig. 1 is a transverse vertical sectional view, as on line 1—1, Fig. 2, showing my invention associated with manual and also air brake means for operating the control valve of the fluid circulating gears and also for applying the friction brakes.

Fig. 2 is a longitudinal section on line 2—2, Figs. 1 and 5.

Fig. 3 is a similar view as on line 3—3, Fig. 1.

Fig. 4 is a similar view as on line 4—4, Figs. 1 and 5.

Fig. 5 is a horizontal section on line 5—5, Figs. 1 and 4.

Fig. 6 is a horizontal section on line 6—6, Figs. 1 and 4.

Fig. 7 is a partial sectional view similar to Fig. 1, drawn on a larger scale.

In the drawings, in which like reference characters refer to like parts, 8 represents my novel brake mechanism associated with a shaft 10, adapted to be driven in either direction by the motive power upon the vehicle, or rotated by the traction wheels of the vehicle, not shown in the drawings.

A rotatable gear unit comprises a casing 12 and is mounted for rotation with the shaft 10 by means of a sleeve, or hub 13, secured to the shaft 10 by keys 14. At one end of the sleeve or hub 13 is a disk 16 carrying a cylindrical wall, or drum 17, forming the casing, which is open at the end thereof opposite to the disk 16, and its outer cylindrical surface forms a brake drum adapted for the application of friction brake shoes 19 and 20, hereinafter described.

A ring gear 22 is located within the casing 12 and comprises a ring, or sleeve 23, having an outer cylindrical surface which is secured to the inner cylindrical surface of the wall 17 of the casing 12 by keys 24. The sleeve 23 is of a length equal to the inner surface of the wall 17 and upon the central portion of its length are gear teeth 25 which project toward the shaft 10 and form part of the ring gear 22. At either side of the teeth 25 are cylindrical facing surfaces 26, formed upon said sleeve 23, adapted to rotate about a stationary bearing unit 28, which is held against rotation with the shaft 10, as hereinafter described.

The stationary unit 28 carries one or more pinion gears 30, 31, 32 and 33, having teeth 34 which mesh with the teeth 25 of the ring gear. Said pinions are rotated by the rotation of the ring gear and form the means for circulating a fluid 35.

The stationary unit comprises two disks 37 and 38, and a spacing collar 39 for holding the disks in spaced relation to each other, with the teeth of the ring gear freely movable between said disks. The peripheries of the disks 37 and 38 have a working fit with said inner cylindrical facing surfaces 26 of the sleeve 23. Said disks 37 and 38 are also provided with packing rings 40 to prevent leakage of the fluid from pressure chambers formed between the disks and occupied by the pinions. The disks 37 and 38 and the collar 39 are provided with axial apertures through which the sleeve 13 and the shaft 10 may freely revolve. The disks 37 and 38 and the collar 39 are secured together and to a stationary wall 42 by means of bolts 43 and 44 extending parallel with the shaft 10.

The pinions 30 to 33 are mounted for rotation upon shafts 46 which occupy apertures formed upon the adjacent faces of the disks or pressure plates 37 and 38. The collar 39 is provided with cylindrical surfaces or walls 47, which fit closely about the teeth 34 of the pinions and form pressure chambers 48, occupied by said pinions, through which chambers the fluid is circulated by the teeth of the pinions when the latter are rotated by the ring gear 22.

The collar 39 has short arms 49, and one long arm 50 which extends radially between the adjacent pressure chambers 48. Said long arm 50 has a cylidrical peripheral surface 51, which is positioned in close relation to the points of the teeth 25 of the ring gear, for retarding the flow of fluid past the arm 50. The other arms 49 are provided with annular channels 52 through which the fluid may freely pass between the adjacent pressure chambers 48, occupied by the pinions, except where said chambers are separated by the long arm 50 of the collar 39.

The disk, or pressure plate 38, of the stationary unit 28 is provided with inlet passages or ports 55 and 56, shown in Figs. 1, 5, and 7, for the entrance of the fluid to the pressure chambers 48. Said ports 55 and 56 are located at opposite sides of the long arm 50, so that when the pinions are rotating in the direction of the small arrows, Fig. 1, the pinions will draw the fluid through the right hand port 56. When the pinions are rotating in the opposite direction, as indicated by the small arrows shown in Fig. 7, the pinions will draw the fluid through the left hand port 55.

The stationary end wall 42 is provided with passages 57 and 58, as shown in Fig. 5, which register respectively with said ports 55 and 56, formed in the disk or pressure plate 38. Said passages 57 and 58 communicate with check valve bodies 60 and 61, having ball check valves 62 and 63 arranged for permitting the fluid to flow in one direction only, to wit, toward the pinion pressure chambers 48. Said check valve bodies 60 and 61 are in communication, through ports 64 and 65 formed in said end wall 42, with a fluid reservoir, hereinafter described.

The long arm 50 of the collar 39 is provided with two discharge ports 67 and 68, as shown in Figs. 1, 2, 5, and 7, through either of which ports the fluid may be discharged from the pinion chambers, depending upon the direction of rotation of the pinions. Said arm 50 is provided with a transverse passage 70 which communicates with said ports 67 and 68 and also with a common longitudinal passage 71, also formed in the arm 50, as shown in Fig. 2, which passage 71 registers with passages 72 and 73, formed through the pressure plate 38 and the end wall 42, as shown in Figs. 2 and 5.

Said transverse passage 70 is provided at either end thereof with valve seats 75 and 76. A check valve in the form of a ball 77 is freely movable through said passage 70 between said seats, and is adapted to close either one of the ports 67 or 68, thereby directing the flow of fluid through the common discharge passage 71.

A control valve 80, shown in Figs. 1 and 4, is connected with said common discharge passage 71, in a manner hereinafter described, so that the fluid will pass through the control valve when the fluid is circulated by the rotation of the pinions.

The control valve 80 comprises a casing 81 having an inlet chamber 82 and an outlet chamber 83, separated by a wall 84, having an aperture 85 for the passage of the fluid between said chambers. A valve stem 86 extends through said aperture and carries a valve head 87, located on the inlet chamber side of the wall 84. A spring 88 tends to close said head upon a seat formed upon the wall 84 and stops the flow from the inlet chamber toward the outlet chamber through the aperture 85. Said stem 86 extends without the casing 81, through a stuffing gland 89.

Means are provided for moving the valve stem 86 for opening the valve 80 and permitting the free circulation of the fluid through the aperture 85 without causing any resistance against the rotation of the pinions 30 to 33. When the valve 80 is closed the circulation of the fluid is stopped, thereby preventing the rotation of the pinions and creating a braking action upon the shaft 10.

A preferred form of my invention includes a housing 90, surrounding the rotatable unit, or casing 12, and also the shaft 10. The housing 90 forms a reservoir for the fluid 35. The above metioned wall 42 forms one end of the housing 90. A cover 93 forms the opposite end wall of the housing and is detachably secured to the body 94 of the housing by bolts 95, said body 94 forms part of the end wall 42.

Said end walls 42 and 93 have bearings 96 and 97 in which the shaft 10 is mounted for rotation. The housing 90 is provided with a flexible coupling 98, having a part thereof secured to a fixed portion 100, of a vehicle, thus providing means for preventing the housing from rotating with the shaft 10.

The fluid is adapted to be drawn by the rotation of the rotatable unit 12 from the reservoir 91, through said ports 64 and 65, past the check valves 62 and 63 and through the passages 57 and 58, formed in the end wall 42 of the housing. Said passages 57 and 58 communicate through the passages, or ports 55 and 56, formed through the disk or pressure plate 38, and open into the pressure chambers 48 for supplying the fluid to either one of the pinions located at either side of the long arm 50 of the stationary unit. The check valves 62 and 63 prevent the return of the fluid to the reservoir 91.

The lower portion of the housing 90 is provided with hollow corrugations forming a fluid cooling radiator 102. The common discharge passage 71 and the passage 72, formed through the stationary unit are connected by the passage 73, formed in the end wall 42 of the housing with the radiator passage 103.

The radiator 102 has end passages 104 and 105 and transverse passages 106 connected together for the circulation of the fluid for cooling the latter. The radiator has an outlet passage 107 connecting with a passage 108, formed around the body portion 94 of the housing. Said passage 108 communicates with the inlet chamber 82 of the control valve 80, through which the fluid freely passes when the control valve is open.

The outlet chamber 83 of the control valve communicates, through a passage 110, formed in the body 94 of the housing, with the reservoir 91. Said passage 110 has an outlet port 112, opening into the reservoir, as shown in Figs. 4 and 5, for the return of the fluid to the reservoir 91 after it passes through the control valve 80.

A pressure regulating valve 114, shown in Figs. 1, 4 and 5, is connected between said passage 108 leading to the control valve 80, and said passage 110 leading from the control valve to the reservoir 91, and is adapted for by-passing the fluid around the control valve 80 at a predetermined pressure.

The relief valve 114 comprises a casing 115 having communicating chambers 116 and 117 connected with said passages 108 and 110, respectively. A valve head 118 is normally held closed, by a spring 120, upon a seat 121 formed within the casing 115 and closes communication between said chambers 116 and 117. A sleeve 122 forms a guide for a stem on the head 118, and said sleeve is adjustably mounted upon the casing 115 and permits the spring to be adjusted to any desired tension for allowing the head 118 to open at a given pressure of the fluid, thereby allowing the fluid to return to the reservoir 91 without passing through the control valve.

The control valve 80 may be operated by moving the valve rod 86 by any suitable means for controlling the flow of fluid through the valve 80, for creating a braking pressure upon the shaft 10.

The housing 90, as shown in Figs. 1 and 2, is mounted upon the brake cylinder 125, of an air brake system of a vehicle. Secured upon the piston 126 of the brake cylinder is a bracket 128, having an arm 129, adapted for engaging the valve stem 86 of the control valve, for moving said stem against the action of the spring 88, thereby holding the control valve open when the piston 126 is moved to a position relatively to the cylinder 125 for releasing the air brake system and in which position the arm 129 engages the stem 86 and holds the latter in a position to open the control valve 80.

When the piston 126 is moved to the position shown in Fig. 1 the valve stem 86 is moved to the closed position of the valve 80 by the spring 88. The closed position of the valve 80 prevents the circulation of the fluid, causing a resistance against the rotation of the pinions of the rotatable unit 12, thus creating a braking action upon the shaft 10.

Cooperating with the air brake system and the fluid brake unit 12, as shown in Fig. 1, are the friction brake shoes 19 and 20, which are mounted within the housing 90 for engagement with the outer surface of the cylindrical casing 17 of the rotatable unit 12. Said shoes 19 and 20 are pivotally mounted upon rods 133, slidably mounted in bearings 135, formed upon the housing. The outer ends of said rods 133 are pivotally connected with levers 136 and 137 which levers are pivotally linked together by cheek plates 138 and 139, extending along either side of the housing. The lever 137 is pivotally connected with a link 140, having its opposite end pivotally connected with the stationary brake cylinder 125. The lever 136 is pivotally connected, at its upper end with the piston 126, which latter is actuated by air pressure within the cylinder 125, in the usual manner, for operating the friction brake shoes.

A hand operated brake rod 142 is also connected with the lever 136 for manually operating the friction brakes and also the valve 80 for operating the fluid brake.

The operation of my invention is as follows: In Fig. 1 the brake cylinder piston 126 and the levers 136 and 137 are shown in a position in which the bracket arm 129 has been moved away from the valve stem 86 of the control valve 80, thereby allowing the control valve 80 to be closed by the action of the spring 88, and thus stop the circulation of the fluid. The static fluid will create a back pressure against the rotation of the pinion gears and hold the ring gear and the casing 12 against rotation, which will create a braking action upon the shaft or axle 10.

A further movement of the piston 126 from the cylinder 125 will cause the friction brake shoes 19 and 20 to engage the casing, or drum 12, for braking the vehicle when the latter is standing upon an inclined surface.

When the shaft 10 and the casing 12 are rotating in either direction, assuming that the friction brakes are released from the casing 12, and the control valve 80 is open, the fluid will circulate freely through the control valve without creating any braking pressure upon the pinions and the shaft 10.

If the shaft 10 and the casing are rotating in the direction of the dotted arrow, Fig. 1, the fluid will be drawn by the rotation of the pinions from the reservoir 91, through the right hand port 65, shown in Fig. 1, and through passages 58 and 56, as shown in Fig. 5, and delivered to the pressure chamber 48 occupied by the pinion 30, the rotation of which will force the fluid in the direction indicated by the small arrows, shown in Fig. 1, through the channels 52 connecting the several pressure chambers formed in the stationary unit 28. The meshing of the teeth of the pinion 30 with the teeth of the ring gear 22 will unload the fluid and direct it through the channel 52 to the next pinion 31, which will force the fluid under an increased pressure to be similarly acted upon by the pinions 32 and 33, successively. The fluid is discharged from the chamber occupied by the pinion 33 through the port 67 formed in the long arm 50 of the collar 39. The ball check valve 77 will be forced by the fluid to a position to close the port 68, thereby directing the fluid through passages 70, 71, and 73 to the radiator 102.

The fluid will be cooled by circulating through the radiator 102 and it will be directed from the radiator through passages 107 and 108 to the open control valve 80 and from the latter through the passage 110 and port 112, opening into the reservoir 91, of the housing 90, thus the fluid will freely circulate without retarding the rotation of the pinions and without creating any breaking action upon the shaft 10.

When the shaft 10 and the casing 12 are rotating in the direction of the dotted arrow, Fig. 7, the fluid will be drawn from the reservoir 91 through the left hand port 64, through passages 57 and 55, to the pressure chamber occupied by the pinion 33. The fluid will then be circulated through the successive pressure chambers occupied by the pinions 32, 31 and 30, from which last mentioned chamber it will pass through the port 68, formed in the long arm 50. The fluid will move the ball check valve 77 to the position shown in Fig. 7 and close the port 67, thus directing the fluid through passages 71, 72 and 73 to the radiator 102 and from the latter through the open control valve and returned to the reservoir 91, as above described.

One or more pinions may be employed for circulating the fluid, the preferred form of my invention includes a plurality of pinions symmetrically arranged about the bearing unit 28 and adapted for boosting the pressure of the fluid as it is acted upon by each pinion successively.

When it is desired to apply the fluid brake to the shaft 10 for stopping the vehicle, the control valve 80 is closed manually, or by the air pressure in the brake cylinder 125.

When the control valve 80 is closed, as shown in Fig. 1, the circulation of the fluid is stopped and the resistance of the static fluid will tend to retard the rotation of the pinions, which in turn will hold the ring gear and the casing 12 against rotation and thereby create a braking action upon the shaft 10. When the vehicle has been stopped by the action of the fluid brake, the friction brake shoes 19 and 20 may be applied to the casing, or drum 12, by a further movement of the piston 126, or the hand brake rod 142, for holding the vehicle at rest when the fluid is not in circulation by the rotation of the pinions and the shaft 10.

The regulating valve 114 may be adjusted for operating the fluid brake at any predetermined pressure of the fluid. When the parts forming the pressure chambers and the pinions have become worn and leakage occurs, the regulating valve may be readjusted so that it will not open until the fluid has reached a higher pressure sufficient to compensate for the leakage.

Various changes in the construction and the arrangement of the parts may be made without departing from my invention.

I claim:

1. A brake comprising a shaft mounted for rotation in either direction, a casing surrounding said shaft and forming a chamber, a fluid contained within said chamber, means for securing the casing upon said shaft for rotation with the latter, a fluid circulating gear located within said casing, means actuated by the rotation of the casing arranged for rotating said gear, a control valve, means forming connections between said chamber and said valve arranged for directing a continuous circulation of the fluid through said valve when the shaft is rotated in either direction, means forming a return connection between said valve and said chamber, and means for closing said valve for restricting the flow of fluid for resisting the rotation of said gear for creating a braking action upon said shaft.

2. A brake comprising a shaft mounted for rotation, a cylindrical casing surrounding the shaft, means securing the casing for rotation with the shaft, a bearing unit mounted within the casing and loosely surrounding the shaft, means securing said unit against rotation with the shaft, said unit having inlet and discharge passages formed therein, a fluid contained within said passages, a control valve connected in communication with said passages, a fluid circulating pinion mounted for rotation upon said unit, means actuated by the rotation of the casing for rotating said pinion for circulating the fluid through the control valve, and means for actuating the control valve for restricting the circulation of the fluid by said pinion for creating a braking action upon said pinion and said shaft.

3. A brake comprising a shaft mounted for rotation, a cylindrical casing surrounding the shaft, means securing the casing for rotation with the shaft, a bearing unit mounted within the casing and loosely surrounding the shaft, means securing said unit against rotation with the shaft, said unit having inlet and discharge passages formed therein, a fluid contained within said passages, a control valve connected in communication with said passages, a fluid circulating pinion mounted for rotation upon said unit, said unit having a pressure chamber occupied by said pinion and communicating with said passages, means actuated by the rotation of the casing adapted for rotating said pinion for circulating the fluid through said chamber and through the control valve, and means for closing the control valve for restricting the circulation of the fluid by said pinion for creating a braking action upon said pinion and said shaft.

4. A brake comprising a shaft mounted for rotation, a cylindrical casing surrounding the shaft, means securing the casing for rotation with the shaft, a bearing unit mounted within the casing and loosely surrounding the shaft, means securing said unit against rotation with the shaft, said unit having inlet and discharge passages formed therein, a fluid contained within said passages, a control valve connected in communication with said passages, a pinion having gear teeth, means mounting the pinion for rotation upon said unit, said unit having a pressure chamber closely surrounding the teeth of said pinion and communicating with said passages, gear teeth upon the casing meshing with the teeth of the pinion for rotating the pinion for circulating the fluid through said chamber and through the control valve, and means for actuating the control valve for restricting the circulation of the fluid by the pinion for creating a braking action upon the pinion and said shaft.

5. A brake comprising a shaft mounted for rotation, a cylindrical casing surrounding the shaft, means securing the casing for rotation with the shaft, a bearing unit mounted within the casing and loosely surrounding the shaft, means securing said unit against rotation with the shaft, said unit having inlet and discharge passages formed therein, a fluid contained within said passages, a control valve connected in communicating with said passages, a pinion having gear teeth, means mounting the pinion for rotation upon said unit, said unit having a pressure chamber closely surrounding the teeth of the pinion and communicating with said passages, a ring gear, means mounting the ring gear upon the inner surface of the casing, said ring gear having teeth meshing with said pinion for rotating the latter for circulating the fluid through said chamber and through the control valve, and means for actuating the control valve for restricting the circulation of the fluid for creating a braking action upon the pinion and said shaft.

6. A brake comprising a shaft mounted for rotation in either direction, a cylindrical casing secured upon said shaft, a gear ring within the casing and rotatable with the latter, a bearing unit closely fitting within the casing about which the latter is rotatable, means securing said unit against rotation with the shaft, a fluid contained within the casing, a pinion gear mounted for rotation upon said unit, said pinion having teeth meshing with the ring gear and rotatable by the latter for circulating the fluid about said unit, and means for stopping the circulation of the fluid about said unit for creating a resistance against the rotation of the pinion and said shaft.

7. A brake comprising a shaft mounted for rotation in either direction, a cylindrical casing secured to the shaft, a ring gear secured within the casing, a bearing unit mounted within the casing about which the latter is rotatable, means securing said unit against rotation with the shaft, a fluid contained within the casing, a pinion gear mounted for rotation upon said unit, said pinion meshing with the ring gear and rotatable by the latter for circulating the fluid about said unit, an arm upon said unit extending adjacent to the ring gear for restricting the flow of the fluid past said arm, said unit having valved inlet passages for admitting the fluid to the casing at either side of said pinion, said arm having a discharge passage with ports communicating with the casing at opposite sides of the arm, a check valve adapted for controlling the flow of fluid through said ports to said discharge passage, and a control valve connected in communication with said inlet and discharge passages and adapted for closing the circulation of the fluid for resisting the rotation of said pinion and said shaft.

8. A brake comprising a shaft mounted for rotation, a cylindrical casing secured upon said shaft, a ring gear secured within the casing, a bearing unit closely fitting within the casing about which the latter is rotatable, means securing said unit against rotation, a fluid contained within the casing, a pinion gear mounted for rotation upon said unit, said pinion meshing with the ring gear and rotatable by the latter for circulating the fluid about said unit, an arm upon said unit extending adjacent to the ring gear for restricting the flow of fluid past said arm, said unit having inlet passages for admitting the fluid to the casing at either side of said arm, said arm having a discharge passage having ports communicating with the casing at opposite sides of the arm, a control valve connected in communication with said inlet and discharge passages and adapted for closing the circulation of the fluid for resisting the rotation of said pinion and said shaft, and a regulating valve connected between said inlet and discharge passages and adapted to open at a predetermined pressure of the fluid for allowing the fluid to by-pass the control valve.

9. A brake comprising a shaft mounted for rotation, a cylindrical casing surrounding the shaft, means mounting the casing for rotation with the shaft, disks surrounding said shaft, a spacing collar located between said disks, means securing said disks and collar together as a unit, means securing said unit against rotation with the shaft, said disks having peripheral facing surfaces about which said casing is adapted to rotate and forming a pressure chamber between the disks, a fluid contained within said chamber, a ring gear located upon the casing between said disks, a pinion meshing with the ring gear, said collar having a recess occupied by the pinion, means mounting the pinion for rotation upon said disks for circulating the fluid through said chamber, a control valve, a connection forming a passage for the fluid from said chamber to said valve, a connection forming a passage from said valve to said chamber, and means for actuating said valve for restricting the circulation of the fluid by said pinion for creating a braking action upon said shaft.

10. A brake comprising a shaft mounted for rotation, a cylindrical casing surrounding the shaft, means securing the casing for rotation with the shaft, a bearing unit mounted within the casing, means securing said unit against rotation with the shaft, said unit having peripheral facing surfaces closely fitting within the cylindrical casing and forming a pressure chamber, a fluid contained within said chamber, a ring gear secured upon the inner surface of the casing within said chamber, a pinion meshing with the ring gear, means mounting the pinion for rotation upon said unit, said unit having a cylindrical wall closely surrounding said pinion and forming a confined channel communicating with said chamber at either side of the pinion through which channel the fluid is circulated by the rotation of the pinion, a segmental arm upon said unit extending into said chamber and terminating closely to the ring gear for preventing the fluid passing said arm, a control valve connected in communication with said chamber through which valve the fluid is circulated by the pinion, and means for closing the control valve for restricting the circulation of the fluid for creating a braking action upon said shaft.

11. A brake comprising a shaft mounted for rotation, a casing secured upon the shaft, a ring gear mounted within the casing and rotatable with the latter, a bearing unit closely fitting within the casing about which the latter is rotatable, means securing said unit against rotation with the shaft, pinion gears mounted for rotation upon said unit and rotatable by the ring gear, a fluid contained within the casing, said pinion gears arranged for successively subjecting the fluid under pressure, a control valve, means forming inlet and oulet passages through which the fluid is circulated from the casing through the control valve, and means for actuating the control valve for stopping the circulation of the fluid for creating a braking action against the rotation of the pinion gears and said shaft.

12. A brake comprising a shaft mounted for rotation, a cylindrical casing secured upon said shaft, a ring gear located within the casing and rotatable with the latter, a bearing unit closely fitting within the casing about which the latter is rotatable, means securing the unit against rotation with the shaft, a fluid contained within the casing, pinion gears mounted upon said unit, said pinions meshing with the ring gear and rotatable by the latter for circulating the fluid about said unit, said unit having pressure chambers in which said pinions are closely confined, said unit having channels connecting said chambers occupied by said pinions through which channels the fluid is directed to each of said pinions successively for boosting the pressure under which the fluid is circulated, and means for stopping the circulation of the fluid about said unit for creating a resistance against the rotation of said pinions and said shaft.

13. A brake comprising a shaft mounted for rotation, a cylindrical casing secured upon said shaft, a ring gear located within the casing and rotatable with the latter, a bearing unit closely fitting within the casing about which the latter is rotatable, a fluid contained within the casing, pinion gears mounted for rotation upon said unit, said pinions meshing with the ring gear and rotatable by the latter for circulating the fluid about said unit, said unit having pressure chambers in which said pinions are closely confined, said unit having peripheral channels connecting the chambers occupied by said pinions through which channels the fluid is circulated about said unit at an increased pressure imparted by the successive pinions, an arm upon said unit located between two of said pinions and terminating adjacent to the ring gear for preventing the fluid from passing said arm, said unit having valved inlet passages for admitting the fluid to the casing at either side of said arm, said arm having discharge ports communicating with the casing at opposite sides of the arm, said unit having a common discharge passage communicating with said ports, a check valve adapted for closing either of said ports, a control valve connected with said common discharge passage, means forming a fluid return passage between the control valve and said inlet passages, and means for closing the control valve for stopping the circulation of the fluid for resisting the rotation of said pinions and said shaft.

14. A brake comprising a shaft mounted for rotation, a casing surrounding said shaft, means mounting the casing for rotation with said shaft, a bearing unit mounted within the casing and loosely surrounding the shaft, means securing said unit against rotation with the shaft, a fluid contained within the casing, said unit having fluid inlet and discharge passages, gears operatively associated with said casing and said unit and actuated by the rotation of the casing for forcing the fluid through said discharge passage, a valve casing having an inlet chamber connected with said discharge passage, said valve casing having an outlet chamber connected with said inlet passage, said valve casing having an aperture forming a communication between said inlet and outlet chambers, a valve movably mounted within the valve casing adapted for opening and closing said aperture, a spring tending to move the valve for closing said aperture for stopping the circulation of the fluid and creating a braking action upon said gears and said shaft, and means for moving the valve against the action of the spring for allowing free circulation of the fluid through the valve casing by the rotation of said gears.

15. A brake comprising a shaft mounted for rotation, a housing surrounding the shaft and forming a reservoir, a fluid contained in said reservoir, means securing the housing against rotation with the shaft, a casing located within the housing and surrounding the shaft, means mounting the casing for rotation with the shaft, a bearing unit mounted within the casing, means securing said unit upon the housing against rotation with the shaft, said unit forming a pressure chamber sealed by said casing, means forming a passage for the fluid from said reservoir to said chamber, fluid circulating gears arranged upon the casing and said unit and operated by the rotation of the casing for circulating the fluid through said chamber, a control valve, means forming a passage for the fluid from said chamber to the control valve, means forming a passage for the fluid from the control valve to the reservoir, and means for closing the control valve for restricting the circulation of the fluid by said gears for creating a braking action upon said shaft.

16. A brake comprising a shaft mounted for rotation, a housing surrounding the shaft and forming a reservoir, a fluid contained in said reservoir, means securing the housing against rotation with the shaft, a casing located within the housing and surrounding the shaft, means mounting the casing for rotation with the shaft, a bearing unit mounted within the casing, means securing said unit upon the housing against rotation with the shaft, said unit having a pressure chamber sealed by said casing, means forming a passage for the fluid from said reservoir to said chamber, fluid circulating gears arranged upon the casing and said unit and operated by the rotation of the casing for circulating the fluid through said chamber, said housing having passages formed therein forming a cooling radiator, means forming a passage for the fluid from said pressure chamber to the radiator, a control valve, means forming a passage for the fluid from the radiator to the control valve, means forming a passage for the fluid from the control valve to said reservoir, and means for operating the control valve for restricting the circulation of the fluid by said gears for creating a braking action upon the shaft.

17. A brake comprising a shaft mounted for rotation, a housing surrounding the shaft and forming a reservoir, a fluid contained in the reservoir, means securing the housing against rotation with the shaft, a casing located within the housing and surrounding the shaft, means mounting the casing for rotation with the shaft, said casing having a cylindrical wall, a friction brake shoe operatively mounted upon the housing, means for engaging the brake shoe with the outer surface of said wall, a bearing unit mounted within the casing, means securing said unit upon the housing against rotation with the shaft, said unit having a pressure chamber sealed by the casing, a control valve, fluid circulating gears arranged upon the casing and said unit and operated by the rotation of the casing for circulating the fluid through said chamber and the control valve, and means for closing the control valve for restricting the circulation of the fluid by the gears and creating a braking action upon said gears and upon said shaft.

18. A fluid brake in combination with a vehicle, a shaft rotatable by the movements of the vehicle, said brake comprising a casing surrounding said shaft, a bearing unit mounted within the casing, means securing said unit against rotation with said shaft, said unit having inlet and discharge passages formed therein, a fluid contained within said passages, a control valve connected in communication with said passages, a fluid circulating pinion mounted for rotation upon said unit, a ring gear mounted upon the casing adapted for rotating the pinion for circulating the fluid through the control valve, a friction brake shoe adapted for holding said shaft against rotation, and means initially movable for closing the control valve for restricting the circulation of the fluid for creating a braking action upon said shaft and a further movement of said last mentioned means arranged for actuating the friction brake shoe for obtaining a multiple braking action for holding said shaft against rotation.

THOMAS JAMES, Jr.